United States Patent [19]

Edele et al.

[11] Patent Number: 4,802,257
[45] Date of Patent: Feb. 7, 1989

[54] WIPER BLADE FOR CLEANING WINDOW PANES OF MOTOR VEHICLES

[75] Inventors: Reinhard Edele, Bietigheim-Bissingen; Eckhardt Schmid, Brackenheim, both of Fed. Rep. of Germany

[73] Assignee: SWF Auto-Electric GmbH, Bietigheim-Bissingen, Fed. Rep. of Germany

[21] Appl. No.: 74,002

[22] Filed: Jul. 16, 1987

[30] Foreign Application Priority Data

Jul. 24, 1986 [DE] Fed. Rep. of Germany ....... 3625063

[51] Int. Cl.⁴ ................................................. B60S 1/40
[52] U.S. Cl. .............................. 15/250.32; 15/250.31; 15/250.42
[58] Field of Search ............ 15/250.31, 250.32, 250.42

[56] References Cited

U.S. PATENT DOCUMENTS

| | | | |
|---|---|---|---|
| 2,620,505 | 12/1952 | Rappl | 15/250.33 |
| 3,864,783 | 2/1975 | Arman | 15/250.32 X |
| 3,866,260 | 2/1975 | Cone | 15/250.32 |
| 4,178,651 | 12/1979 | Mayer | 15/250.32 |
| 4,389,746 | 6/1983 | Kimber | 15/250.32 |
| 4,446,589 | 5/1984 | Maiollo | 15/250.32 |
| 4,503,580 | 3/1985 | Sharp | 15/250.32 |

FOREIGN PATENT DOCUMENTS 721442 11/1965 Canada ............................ 15/250.32

Primary Examiner—Edward L. Roberts
Assistant Examiner—K. L. O'Leary
Attorney, Agent, or Firm—James B. Raden

[57] ABSTRACT

This invention describes a wiper blade with a substantially U-shaped supporting yoke between the side walls of which is fixed a component part which, coaxially to bores in the side walls of the supporting yoke, has a bearing bore for a pivot pin connecting the wiper blade and wiper arm. The diameter of the bore in the side walls is larger than the diameter of the pivot pin, so that a metallic contact between pivot pin and side walls of the supporting yoke is prevented. In order to secure the position of the bearing axially a metallic locking spring is additionally fixed in this component part which cooperates with a groove in the pivot pin.

15 Claims, 2 Drawing Sheets

U.S. Patent    Feb. 7, 1989    Sheet 1 of 2    4,802,257
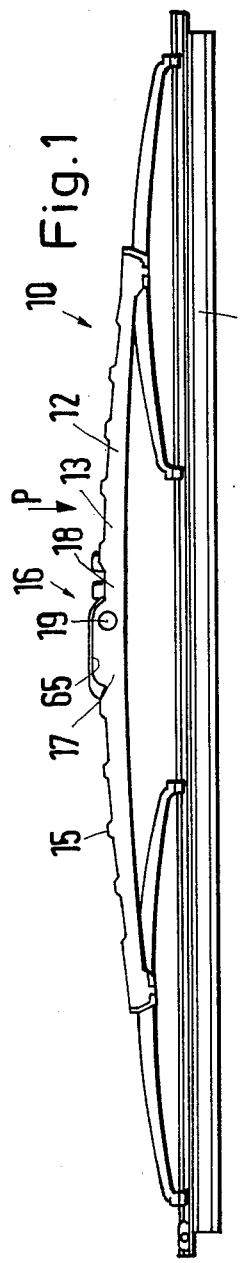
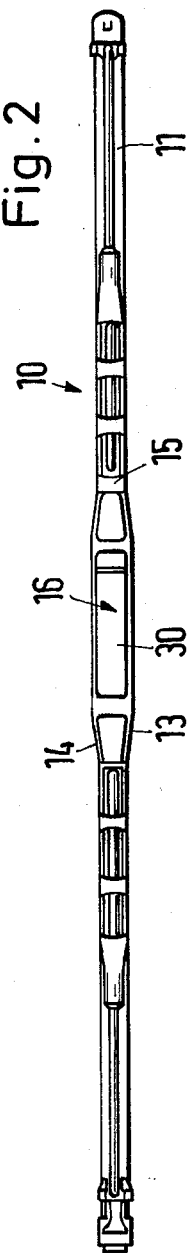
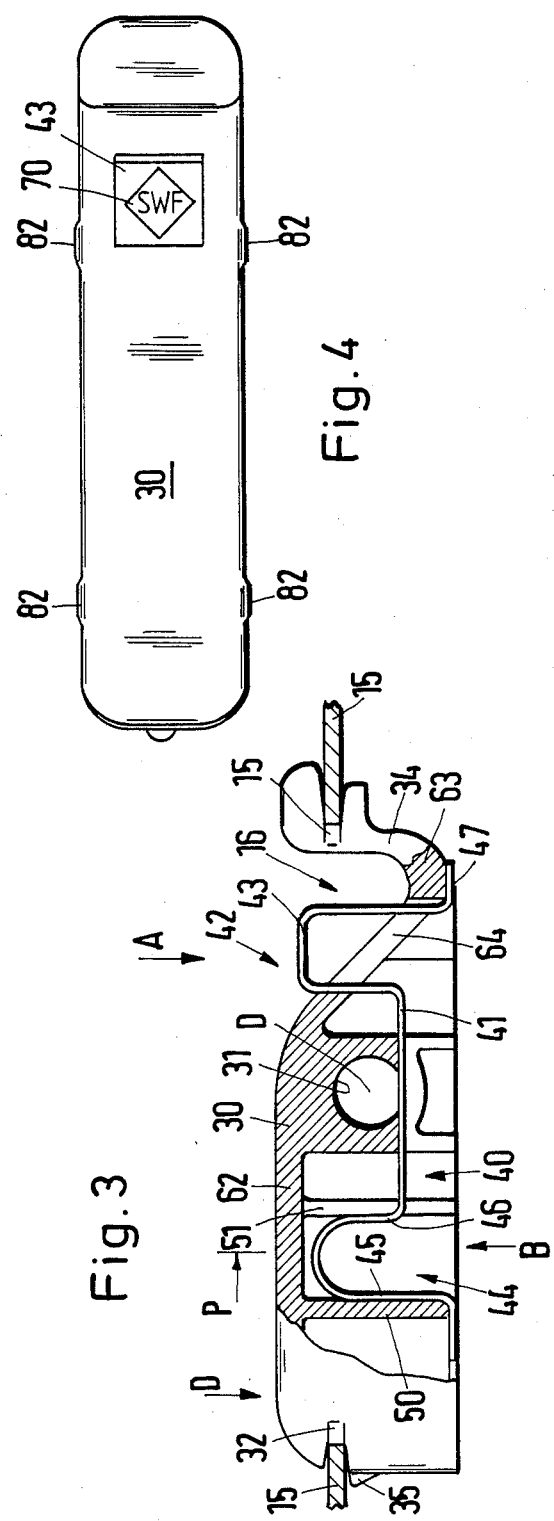

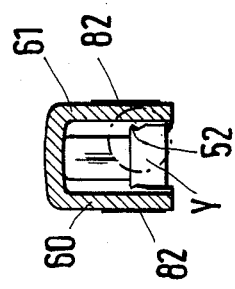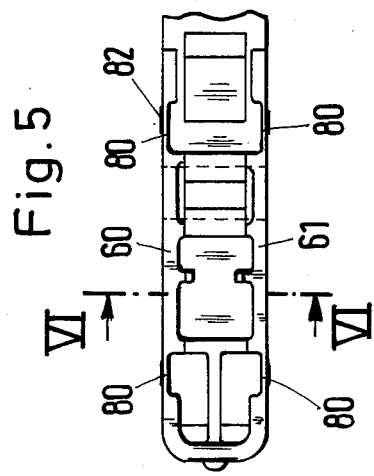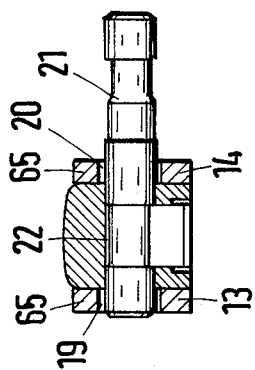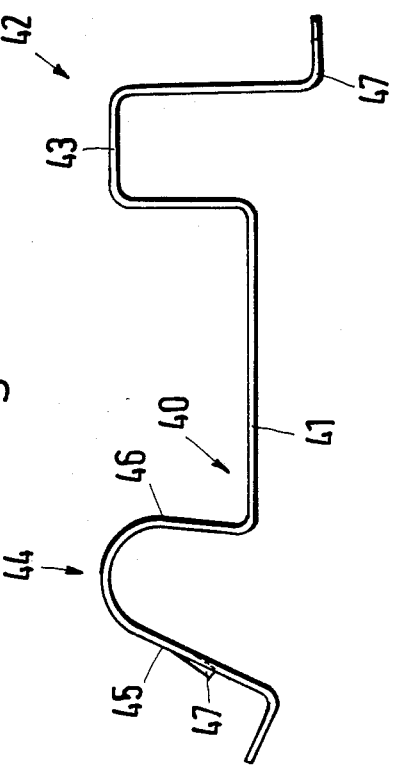

WIPER BLADE FOR CLEANING WINDOW PANES OF MOTOR VEHICLES

BACKGROUND OF THE INVENTION

The invention relates to a wiper blade which may be articulated onto a pivot pin laterally projecting from a wiper arm. One such wiper blade is disclosed in German specification DE-OS No. 3,047,953. In this wiper blade a component part for axially securing the pivot pin is fixed between the side walls in the area of an aperture formed in the back of the supporting yoke. Laterally beside the bores for the pivot pin, the wiper blade, for this purpose, has a rivet connecting the side walls by means of which the component part may be locked. The component part is made of an elastic plastics material. Furthermore, the component part has an integral locking spring intersecting the bore for the pivot pin and cooperating with a circumferential groove in the pivot pin. This pivot pin is thereby exclusively guided in the side walls of the supporting yoke and the additional component part serves exclusively to secure the axial position of the pivot pin. The contact pressure transmitted from the wiper arm onto the wiper blade via the pin is thus only transmitted over a very small area due to the small wall thickness of the metal sheet out of which the supporting yoke is made. Consequently, an unacceptable play can occur between pivot pin and these bores in the side walls of the supporting yoke during the service life. A further disadvantage of this known wiper blade is the metallic contact between the pivot pin and the metallic wiper blade supporting yoke, which can result in increased noise and in increased corrosion in this area. Moreover, it is disadvantageous in this known construction that an additional rivet has to be used to fix the component part. This additional rivet makes the construction more expensive. Finally, the axial securing in position of the pivot pin on the wiper blade does not either meet all requirements. The reason is that the depth of the groove on the pivot pin is relatively small and the plastic locking spring wears so much on its narrow sides during its service life that it cannot be ensured that the pivot pin is axially locked.

SUMMARY OF THE INVENTION

The present invention provides a wiper blade of this kind with a simple means for avoiding the disadvantages mentioned above. A large-area guidance for the pivot pin is provided and a metallic contact between pivot pin and supporting yoke is avoided.

Thus in accordance with this invention an additional component part provides the bearing function for the pivot pin so that it is supported over a large area, namely over the entire width of the supporting yoke. The bores in the side walls of the supporting yoke however do not guide the pivot pin and do not touch it.

In a construction of this kind the said component part has, of course, to be reliably anchored onto the supporting yoke. This is achieved in a simple manner. By the areas of the supporting yoke web engaging in the grooves of the component part, the component part is supported in a dimensionally stable way in the direction of the contact pressure acting upon the wiper blade via the pivot pin. A simple locking of the component part in the supporting yoke is also ensured and enables an easy assembly and disassembly. Thus the component part can be demounted, if necessary, and, if desired, a rivet for another connecting element can be inserted, e.g. for a usual two-legged locking spring for a connection with a hooked wiper arm.

In order to increase the stability of the joint connection between pin and said component part a metallic locking spring is used and is secured to the said component part.

Other advantageous developments of the invention relate to the construction of the component part and of the locking spring, wherein by these features it is possible to secure the component part free from play, to mount the locking spring easily with good access and operation by of a release key provided on the locking spring. In addition, the requirements concerning style and safety are complied

BRIEF DESCRIPTION OF THE DRAWING

The invention and its advantages are described below in detail by way of the embodiments shown in the accompanying drawing, in which:

FIG. 1 is a lateral view of a wiper blade in accordance with this invention;

FIG. 2 is a view of the wiper blade in the direction of the arrow P in FIG. 1;

FIG. 3 is a partial section through the component part used with the embodiment of FIG. 1;

FIG. 4 is a top view of the component part in the direction of arrow A in FIG. 3;

FIG. 5 is a bottom view of the component part in the direction of arrow B in FIG. 3;

FIG. 6 is a section through the component part taken on the line VI—VI of FIG. 5;

FIG. 7 is an enlarged illustration of circled section Y of FIG. 6;

FIG. 8 is a lateral view of a locking spring; and,

FIG. 9 is a section through the wiper blade in the area of the pivot pin.

DETAILED DESCRIPTION

The wiper blade shown in FIGS. 1 and 2 has a supporting yoke system 10 for guiding a wiper element 11. Part of this supporting yoke system 10 is a supporting yoke 12 which is made from a metal blank and has, as seen in FIG. 2, a substantially U-shaped cross-section with two side walls 13 and 14 and a web 15 connecting these side walls. The web 15 of the supporting yoke 12 has an aperture 16 approximately in its center. In the area of this aperture 16 the side walls 13 and 14 have a portion 17 with a larger height and, adjoining thereto, a portion 18 with a smaller height. Two bores 19 and 20, coaxially aligned with each other, are formed in the portion 17 with larger height. These bores 19 and 20 serve to receive a pivot pin 21 as is shown in FIG. 9 and as will be described later.

Between the side walls 13 and 14 of the supporting yoke 12 there is fixed a plastic component part 30 which serves for securing the position of the pivot pin 21 axially. According to the invention, the plastic component part also serves as a support for the pivot pin 21. For this purpose the said component part 30 has a bearing bore 31 coaxially aligned with the bores 19 and 20, and the diameter of the bearing bore is adapted to the diameter of the pivot pin 21. In contrast thereto the diameter of the bores 19 and 20 in the two side walls 13 and 14 of the supporting yoke 12 is larger than the diameter of the pivot pin 21 as can be clearly seen in FIG. 8. Thus, the pivot pin 21 does not touch the side walls 13, 14 of the supporting yoke. Therefore the lacquer layer on the rim of the bores 19 and 20 is effectively protected against being damaged by the pivot pin so that corrosion in this area is not to be expected.

In FIG. 3 it can be seen that, when viewed in the longitudinal direction of the wiper blade, the component part 30 has grooves 32 and 33 on both sides, which grooves are adapted to the thickness of the web 15. These grooves 32 and 33 engage in a form-locking manner in the areas of the web 15 adjacent the aperture 16 in the web so that a stable anchoring of the component part 30 with the supporting yoke 12 is ensured. The groove 33 is formed on a spring lug 34 which is substantially deflectable in the longitudinal direction of the wiper blade. Thus, seen in the longitudinal direction of the wiper blade, the component part 30 may be locked between the web portions 15 adjoining the aperture 16. Usually the groove 33 on the spring lug 34 is at first inserted in the web portion and then, at the opposite side, the component part 30 is pressed into the aperture 16 in the direction of arrow D, whereby an inserting cam 35 with a slanting stop face facilitates the engagement.

A metallic locking spring 40 serves to secure the position of the pivot pin 21 axially. This locking spring 40, as shown in FIG. 3, interesects the bearing bore 31 and cooperates in a known manner with a groove 22 on the pivot pin. The metallic locking spring 40 reliably locks the pivot pin 21 with the component part 30 even after a long service life.

The shape of this locking spring 40 can be seen from FIGS. 3 and 8. On one side of the portion 41 intersecting the bearing bore 31 the said locking spring 40 has a substantially U-shaped bend 42 with a planar base 43 serving as a release key. On the other side the locking spring 40 has a second substantially U-shaped bend 44 with two shanks 45, 46 (please compare FIG. 8) which are originally spaced apart and which are braced between perpendicular holding walls 50, 51 on the component part 30. From one shank 45, a fixing nose 47 protrudes which digs into the holding wall 50. A groove 52 (see FIGS. 6 and 7) is formed in the holding wall 51, into which the portion 41 intersecting the bore 31 is locked in the vicinity of the transition to the shank 46. The locking spring 40 can be mounted in a simple manner, because it has only to be inserted in the direction of arrow B from below.

The component part 30 is substantially box-shaped and has two supporting yokes 60 and 61 and a rear wall 62, from which the holding walls 50 and 51 project perpendicularly. The rear wall 62 has an opening 64 in an area slantingly connected to the foot 63 of the spring lug 34 through which the U-shaped bend 42 with the release key 43 projects. By a comparison between FIGS. 3 and 1 one can see that the contour of the said component part 30 is adapted to the contour of the side walls 13, 14 of the supporting yoke 12. The aperture 16 in the supporting yoke 12 is completely covered by the said component part in the area of the side wall portion 17 with larger height, so that there is minimal risk of injury at the upper rim 65 of the side walls 13 and 14. The opening 64 for the release key 43 is arranged in the area of the side wall portion 18 of smaller height. The base 43 of the release key is positioned in a plane between the rim 65 of the side wall portion 17 of larger height and the rim of the side wall portion 18 of smaller height. Thus this planar base 43 does not project beyond the back of the component part 30, but is nevertheless easily accessible.

FIG. 3 clearly shows that the locking spring portion 41 intersects the bearing bore in 31 an area which is farther away from the rear wall 62 of the component part 30 than the axis of rotation D of the pivot pin 21. The locking between the pivot pin 21 and the component part 30 and/or the wiper blade may be released by exertion of pressure onto the release key 42 in the direction of arrow A, i.e., in the direction toward the window pane to be cleaned. After the pivot pin has been removed the said locking spring springs back into the rest position shown in FIG. 3, whereby a bent stud 48 abuts the foot 63 of the spring shank 34 and thus limits the spring travel.

FIG. 4 shows that the base 43, and thus the release key, has a marking 70 characterizing the manufacturer. If desired this area can also be marked in color, e.g. by being injection-molded around with plastics material, so that a user can easily see where the connection between wiper blade and wiper arm may be unlocked.

From FIG. 5 can also be seen that the side walls 60 and 61 have portions 80 with smaller wall thickness. On their outside, portions 80 have ribs for the compensation of play. When the component part 30 has been inserted, the ribs rest against the side walls 13, 14 of the supporting yoke 12 in a manner free from play.

On the whole the component part 30 can be produced at favorable cost as a simple injection-molded part, and the mounting of the locking spring does not involve difficulties. The component part 30 can be reliably locked on the supporting yoke and is thus stable between the side walls of the supporting yoke with the bearing bore aligned coaxially to the larger diameter bores 19, 20 in the side walls. A leaf spring punched out from a metal sheet serves as a locking spring. In this way it is thus ensured that the laterally inserted pivot pin does not touch the supporting yoke, has a large-area bearing surface substantially corresponding to the width of the supporting yoke and is reliably secured in its axial position by a metallic locking spring. Due to the special construction of the locking spring a release and thus an exchange of a wiper blade does not involve any problems either.

What is claimed is:

1. A wiper blade, comprising a supporting yoke having a substantially U-shaped cross-section formed by two side walls and a connecting web, an aperture in said web, in the area of said aperture said side walls being provided with coaxially aligned bores for receiving an insertable pin for articulating a wiper arm, a component part fixed between the side walls for axially securing the position of the pivot pin, said component part having a bearing bore which is coaxially aligned with said first mentioned bores, the diameter of said first mentioned bores being substantially larger than the diameter of the pivot pin to be received therein whereby there is no contact between the pivot pin and the walls of said first mentioned bores a metallic locking spring being fixed in the component part which intersects the bearing bore for cooperation with a groove in the pivot pin, the portion of said locking spring which contacts the pivot pin being essentially flat and having similar width as said groove in the pivot pin so that the pivot pin is axially secured.

2. A wiper blade according to claim 1 wherein, in the longitudinal direction of the wiper blade, the component part has grooves adapted to the thickness of the web, said grooves engaging areas of the web adjacent to the aperture, one of said grooves being formed on a spring lug integrally projecting from the component part, said spring lug being capable of deflection in the longitudinal direction of the wiper blade, whereby the component part is braced between the areas of the web adjoining the aperture.

3. A wiper blade according to claim 1 wherein the metallic locking spring has two substantial U-shaped portions, said U-shaped portions being located on either side of the portion of the locking spring which intersects the bearing bore.

4. A wiper blade according to claim 3 wherein the component part is substantially box-shaped with two side walls adjacent to the side walls of the supporting yoke, said component part having a rear wall covering at least certain areas of the aperture and a release key projecting through an opening of the rear wall of the component part.

5. A wiper blade according to claim 4 wherein the locking spring intersects the bearing bore in an area which is farther away from the rear wall of the component part than the axis of rotation in the bearing bore for the pivot pin whereby the pivot pin may be unlocked by exerting pressure on the release key.

6. A wiper blade according to claim 1 wherein the first of the substantially U-shaped portions of the locking spring has a preferably planar base serving as said release key.

7. A wiper blade according to claim 6 wherein the release key projects through an opening in the rear wall of the component part between the bearing bore and the spring lug integrally projecting from the component part.

8. A wiper blade according to claim 6 wherein the second of the substantially U-shaped portions of the locking spring is formed with two shanks, said two shanks being braced between holding ribs perpendicularly projecting from the rear wall of the component part.

9. A wiper blade according to claim 7 wherein a fixing nose projects from one of said shanks, said fixing nose digging into said holding ribs.

10. A wiper blade according to claim 8, wherein a groove is formed in said holding ribs and wherein close to the transition to said first substantially U-shaped portion, the portion of the locking spring intersecting the bearing bore is locked in said groove in the holding ribs.

11. A wiper blade according to claim 6 wherein the base serving as a release key has a marking so that a user can easily find it.

12. A wiper blade according to claim 6 wherein in the area of the aperture the side walls of the supporting yoke have a first portion of larger height and, adjoining thereto, a second portion of smaller height, the release key being arranged between the side wall portions with smaller height.

13. A wiper blade according to claim 12, wherein the area of the side wall portions with larger height, the rear wall of the component part covers the aperture completely.

14. A wiper blade according to claim 12, characterized in that the side walls of the component part include portions with a smaller wall thickness and ribs projecting toward the side walls of the supporting yoke for compensating for play.

15. A wiper blade according to claim 12 wherein the planar base of the release key is positioned in a plane between said side wall portion with larger height and said side wall portion with smaller height.

* * * * *